US012631464B2

(12) United States Patent  (10) Patent No.: US 12,631,464 B2
Okada et al.  (45) Date of Patent: May 19, 2026

(54) FLOOD INFORMATION PROCESSING DEVICE

(71) Applicant: TOYOTA JIDOSHA KABUSHIKI KAISHA, Toyota (JP)

(72) Inventors: Kazuya Okada, Tokyo (JP); Hiroshi Abe, Kasukabe (JP); Naoya Kaneko, Tokyo (JP); Toru Furusawa, Yokohama (JP); Takayuki Sakai, Tokyo (JP); Koji Takeoka, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 18/786,993

(22) Filed: Jul. 29, 2024

(65) Prior Publication Data

US 2025/0146831 A1  May 8, 2025

(30) Foreign Application Priority Data

Nov. 2, 2023  (JP) ................................ 2023-188327

(51) Int. Cl.
*G01C 21/36* (2006.01)
*G08B 21/10* (2006.01)
*H04W 4/90* (2018.01)

(52) U.S. Cl.
CPC ..... *G01C 21/3626* (2013.01); *G01C 21/3691* (2013.01); *G08B 21/10* (2013.01); *H04W 4/90* (2018.02)

(58) Field of Classification Search
CPC ....................... G01C 21/3626; G01C 21/3691; G08B 21/10; H04W 4/90
See application file for complete search history.

(56) References Cited

U.S. PATENT DOCUMENTS

| | | | | |
|---|---|---|---|---|
| 9,207,338 | B2 * | 12/2015 | Williams | G01V 1/223 |
| 11,513,535 | B2 * | 11/2022 | Badouin | G05D 1/0297 |
| 11,851,089 | B1 * | 12/2023 | Hinojosa | B60W 40/02 |
| 12,062,230 | B2 * | 8/2024 | Tanaka | G06V 20/176 |
| 2014/0309864 | A1 * | 10/2014 | Ricci | B60W 50/085 |
| | | | | 701/36 |
| 2023/0152119 | A1 * | 5/2023 | Konno | G01C 21/3691 |
| | | | | 701/117 |

FOREIGN PATENT DOCUMENTS

JP  2022-158021 A  10/2022

* cited by examiner

*Primary Examiner* — John A Tweel, Jr.
(74) *Attorney, Agent, or Firm* — SoraIP, Inc.

(57) ABSTRACT

A control unit is provided which is configured to execute: acquiring an occurrence position of an abnormal interruption in communication with a vehicle and an occurrence position of an abnormal interruption in communication; detecting that a flood damage has occurred in the first area in response to an abnormal interruption in communication occurring a predetermined number of times or more at a position lower than a predetermined altitude in the first area; and outputting information on flood damage in response to detecting that a flood damage has occurred in the first area.

5 Claims, 4 Drawing Sheets

VEHICLE DATA

| VEHICLE ID | DATE AND TIME INFORMATION | POSITION INFORMATION | STATUS |
|---|---|---|---|
| V0001 | X | LATITUDE, LONGITUDE, AND ALTITUDE | POWER ON |

FIG. 3

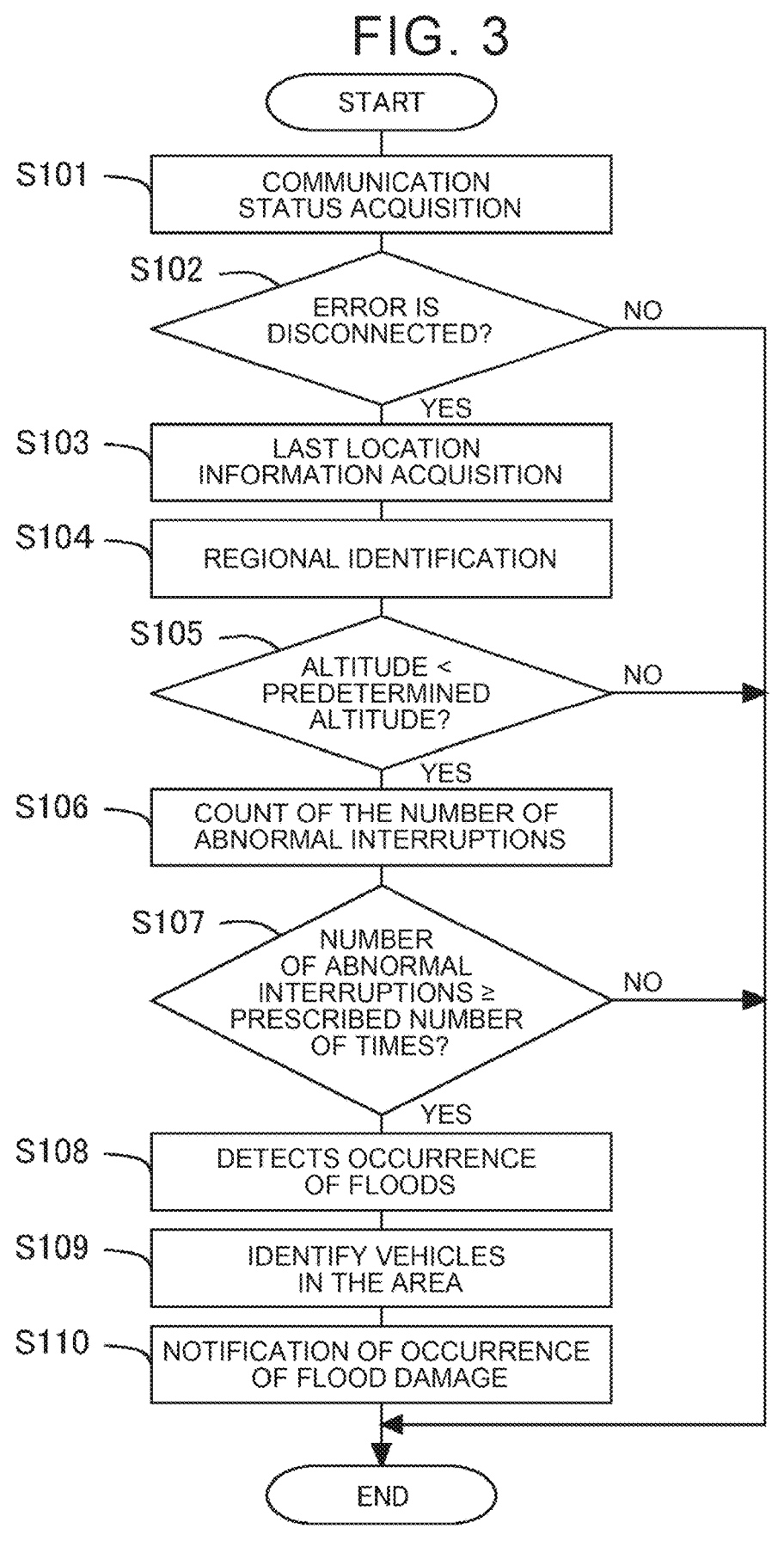

START

S101 — COMMUNICATION STATUS ACQUISITION

S102 — ERROR IS DISCONNECTED? — NO

YES

S103 — LAST LOCATION INFORMATION ACQUISITION

S104 — REGIONAL IDENTIFICATION

S105 — ALTITUDE < PREDETERMINED ALTITUDE? — NO

YES

S106 — COUNT OF THE NUMBER OF ABNORMAL INTERRUPTIONS

S107 — NUMBER OF ABNORMAL INTERRUPTIONS ≥ PRESCRIBED NUMBER OF TIMES? — NO

YES

S108 — DETECTS OCCURRENCE OF FLOODS

S109 — IDENTIFY VEHICLES IN THE AREA

S110 — NOTIFICATION OF OCCURRENCE OF FLOOD DAMAGE

END

FLOOD INFORMATION PROCESSING DEVICE

CROSS-REFERENCE TO RELATED APPLICATION

This application claims priority to Japanese Patent Application No. 2023-188327 filed on Nov. 2, 2023, incorporated herein by reference in its entirety.

BACKGROUND

1. Technical Field

The present disclosure relates to an information processing device.

2. Description of Related Art

It is known that the power supply of a communication terminal of a vehicle is switched from an in-vehicle battery to a built-in battery of the communication terminal when water entry into the vehicle is detected (for example, Japanese Unexamined Patent Application Publication No. 2022-158021 (JP 2022-158021 A)).

SUMMARY

An object of the present disclosure is to detect a flooded region.

One aspect of the present disclosure relates to an information processing device including a control unit configured to:
  acquire occurrence of an abnormal interruption of communication with a vehicle and a position of the occurrence of the abnormal interruption of the communication;
  detect that a flood has occurred in a first region when the abnormal interruption of the communication has occurred a predetermined number of times or more at a position with an altitude lower than a predetermined altitude in the first region; and
  output information on the flood in response to detection that the flood has occurred in the first region.

Other aspects of the present disclosure relate to an information processing method in which a computer executes processes of the information processing device, a program for causing the computer to execute the information processing method, and a storage medium that stores the program in a non-transitory manner.

According to the present disclosure, it is possible to detect the flooded region.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart of a process in which the server according to the first embodiment detects occurrence of flood damage;

DETAILED DESCRIPTION OF EMBODIMENTS

Figures 1, 2:
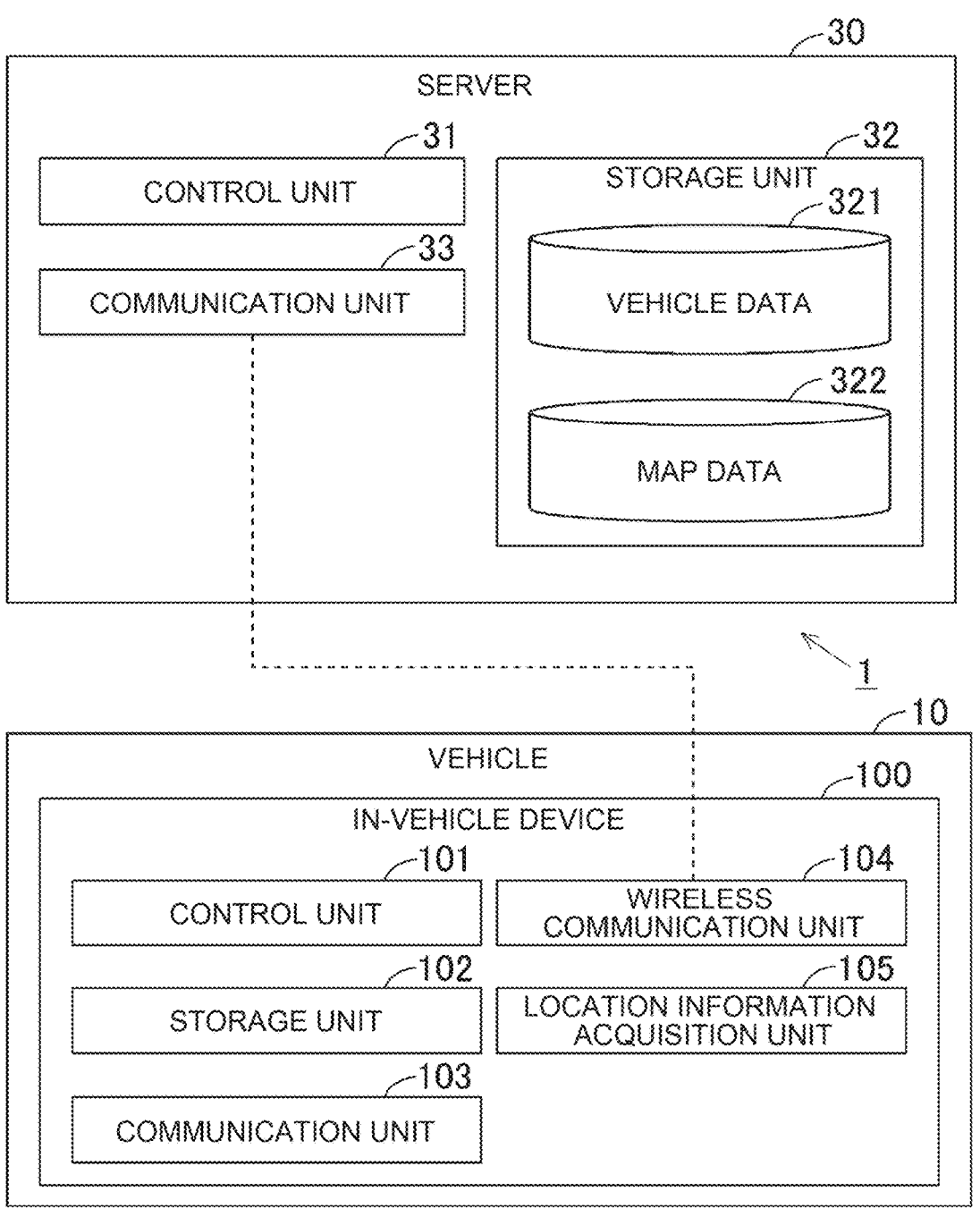
FIG. 1 is a diagram illustrating a schematic configuration of a system according to a first embodiment.
FIG. 2 is an example of vehicle data.

There is a desire to grasp the area where flood damage occurred. Therefore, it is desired not only to detect submergence in individual vehicles but also to detect occurrence of flood damage in the center. Therefore, according to the present disclosure, a region in which flood damage has occurred is identified by paying attention to occurrence of an abnormal interruption in communication with a vehicle when the vehicle is submerged in water.

The control unit acquires an occurrence position of an abnormal interruption in communication with the vehicle and an occurrence position of an abnormal interruption in communication. The vehicle transmits, for example, information related to the state of the vehicle and information related to the state of communication at predetermined time intervals. This transmission is performed even when the vehicle is parked. However, when the vehicle is submerged in water, communication is interrupted due to a failure of a communication device included in the vehicle. Note that the interruption of communication despite the scheduled communication with the vehicle is referred to as an abnormal interruption. Therefore, even if the communication is interrupted due to some factor, if the communication is resumed thereafter, the vehicle cannot be said to be submerged in water, and thus is not included in the abnormal interruption of the present disclosure. The occurrence position of the abnormal interruption may be a position at which communication was last performed. The location of occurrence may be indicated by, for example, latitude, longitude, and altitude.

However, the abnormal interruption of the communication may occur in addition to the submergence of the vehicle. For example, there may be a problem with a base station intervening in communication with a vehicle, and an abnormal interruption of communication may occur. Therefore, the control unit detects that the flood damage has occurred in the first area in response to the abnormal interruption of the communication occurring at a position lower than the predetermined altitude by a predetermined number of times or more in the first area. The first region is, for example, a region defined by an administrative division or a regional mesh. Here, the lower the altitude at which the vehicle is located, the higher the likelihood that the vehicle will be submerged. For example, even if flood damage occurs, if the vehicle is parked in a high-altitude position such as a multi-story parking lot, the vehicle does not need to be submerged. Therefore, if an abnormal interruption of communication occurs frequently at a position lower than a predetermined altitude, it can be said that there is a high possibility that a flood damage has occurred. The predetermined altitude is an altitude at which the communication of the vehicle is not interrupted even when a flood damage occurs. Further, the predetermined number of times corresponds to the number of vehicles that are considered to be submerged in a case where flood damage occurs. The predetermined altitude and the predetermined number of times may be set in consideration of an error, or may be set to different values depending on the region.

Then, the control unit outputs information related to the flood damage in response to detecting that the flood damage has occurred in the first area. The output of the information may include a notification that a flood has occurred in the first region. In addition, the control unit may store the information related to the flood damage in the storage unit so as to be output.

In addition, the control unit may detect that the flood damage has occurred in the first area in response to the number of occurrence of the abnormal interruption of the communication being equal to or less than the second predetermined number of times at a position equal to or higher than the predetermined altitude in the first area. That is, the occurrence of the flood damage may be detected on condition that the abnormal interruption of the communication does not occur frequently at a position of a predetermined altitude or higher. The second predetermined number of times is, for example, the number of abnormal interruptions that can occur even when no flood damage has occurred. The second predetermined number of times may be 0.

In addition, the control unit may output the first area in which the occurrence of the flood damage is detected in association with a map. For example, a first area in which flood damage has occurred may be shown on the map. In this way, it is possible to output information about the area where the flood is occurring in the level real time.

Further, the control unit may predict a second area in which the flood damage occurs in the future based on time transitions of the plurality of first areas in which the flood damage is detected. When flood damage occurs in a plurality of first areas, the expansion direction of the first area can be detected, and therefore it can be predicted that flood damage will occur in the future in the area located in the expansion direction.

Further, the control unit may notify the terminal of the owner of the vehicle existing in the first area or the vehicle existing in the first area that has detected the occurrence of the flood damage. In this way, it is possible to notify the user of the area where the flood damage is occurring, and thus it is possible to prompt the user to move the vehicle.

Hereinafter, embodiments of the present disclosure will be described with reference to the drawings. The configurations of the following embodiments are illustrative, and the present disclosure is not limited to the configurations of the embodiments. Further, the following embodiments can be combined as much as possible.

First Embodiment

FIG. 1 is a diagram illustrating the overall configuration of a system 1 according to a first embodiment. The system 1 according to the present embodiment includes a vehicle 10 and a server 30. The vehicle 10 is a connected car having a function of communicating with an external network. The vehicle 10 includes an in-vehicle device 100. The in-vehicle device 100 may be, for example, a Data Communication Module (DCM). There is a plurality of vehicles 10.

The in-vehicle device 100 is a device that performs wireless communication with an external network. The in-vehicle device 100 is configured to be communicable via a cellular communication network. The cellular communication network is a communication network using a cellular network. When detecting an available cellular communication network, the in-vehicle device 100 attaches to the cellular communication network.

The server 30 communicates with the in-vehicle device 100 to collect various types of information from the vehicle 10. The information collected from the vehicle 10 includes, for example, position information, information related to an operating state of the vehicle 10, and information related to a communication state. The information regarding the operating state of the vehicle 10 is information indicating which of the state in which the vehicle 10 is powered on (or IG-ON) or the state in which the vehicle is powered off (or IG-OFF). Power-on and power-off are switched each time the user presses a power switch. In addition, detection values of various sensors included in the vehicle 10 are transmitted from the in-vehicle device 100 to the server 30. Even when the vehicle 10 is in the power-off state, the vehicle 10 and the server 30 periodically communicate with each other. The information on the communication state includes information on the communication quality and the radio wave intensity.

The in-vehicle device 100 includes a control unit 101, a storage unit 102, a communication unit 103, a wireless communication unit 104, and a position information acquisition unit 105. The control unit 101 is an arithmetic unit that realizes various functions of the in-vehicle device 100 by executing a predetermined program. The control unit 101 may be implemented by, for example, a CPU.

The control unit 101 transmits the vehicle data to the server 30 at a predetermined timing. FIG. 2 is an example of vehicle data. As illustrated, the vehicle data includes fields of vehicle ID, date and time information, location information, and status. Note that the present disclosure is not limited to this, and for example, information on communication quality may be included in the vehicle data. The vehicle ID field is stored with an identifier that uniquely identifies the vehicle. The date and time information field stores the date and time when the vehicle data was generated. In the position information field, position information (for example, latitude, longitude, and altitude) acquired by the position information acquisition unit 105 is stored. In the status field, data related to the operating state of the vehicle is stored. The operating state of the vehicle is represented by, for example, power-on or power-off. In the present embodiment, the vehicle data is transmitted to the server 30 in either the power-on or power-off state. However, the frequency of transmitting the vehicle data may be changed between the power-on state and the power-off state. For example, the frequency of transmitting the vehicle data may be lower in the power-off state than in the power-on state. In addition, the frequency of transmitting the vehicle data may be changed depending on the duration of the power-off state. For example, the frequency of transmitting the vehicle data may be decreased as the duration of the power-off state is longer. In addition, when the power-off state continues for a certain period of time, transmission of vehicle data may be stopped in order to suppress a decrease in the remaining amount of the battery.

The storage unit 102 is means for storing information, and is composed of a storage medium such as a RAM, a magnetic disk, or a flash memory. The storage unit 102 stores various programs executed by the control unit 101, data used by the programs, and the like. The communication unit 103 is a communication interface that connects the in-vehicle device 100 to a bus of an in-vehicle network.

The wireless communication unit 104 includes an antenna and a communication module for performing wireless communication. The antenna is an antenna element that inputs and outputs a wireless signal. In this embodiment, the antennae are adapted to mobile communications (e.g., mobile communications such as 3G, LTE, 5G, 6G). The communication module is a module for performing mobile communication.

The position information acquisition unit 105 includes GPS antennae and positioning modules for positioning the position information. The GPS antenna is an antenna that receives a positioning signal sent from a positioning satellite (also referred to as a global navigation satellite system (GNSS) satellite). The positioning module is a module that calculates the position information based on a signal received by the GPS antenna.

The server 30 includes a control unit 31, a storage unit 32, and a communication unit 33. The control unit 31 is an arithmetic unit that controls the control performed by the server 30. The control unit 31 can be realized by an arithmetic processor such as a CPU. The control unit 31 performs a process of collecting vehicle data from a plurality of vehicles 10 (in-vehicle devices 100) and storing the vehicle data as vehicle data 321 in a storage unit 32 to be described later.

The storage unit 32 includes a main storage device and an auxiliary storage device. The main storage device is a memory in which a program executed by the control unit 31 and data used by the control program are loaded. The auxiliary storage device is a device in which a program executed by the control unit 31 and data used by the control program are stored.

In addition, the storage unit 32 stores vehicle data 321 and map data 322. The vehicle data 321 is a set of a plurality of vehicle data transmitted from the in-vehicle device 100. The vehicle data 321 stores a plurality of vehicle data described with reference to FIG. 2. The map data 322 is a database in which data related to a topographic map and data related to a road network are stored. The map data 322 may store data related to a feature. Further, the map data 322 may include information on a hazard map indicating a place where flood damage may occur. Note that the map data 322 may be provided from an external server.

The communication unit 33 is a communication interface for connecting the server 30 to a network. The communication unit 33 includes, for example, a network interface board and a wireless communication interface for wireless communication.

Note that the configuration illustrated in FIG. 1 is an example, and all or a part of the illustrated functions may be executed using a dedicated circuit. Further, a program may be stored or executed by a combination of the main storage device and the auxiliary storage device other than the functions shown in the figure.

When periodic communication with the vehicle 10 is interrupted, the control unit 31 determines that an abnormal interruption has occurred. The occurrence of the abnormal interruption may be determined by analyzing the communication log, or may be determined by not updating the vehicle data 321. The control unit 31 specifies the position where the abnormal interruption occurs in the case where the abnormal interruption occurs. The control unit 31 extracts the position information finally stored in the vehicle data 321, and identifies the position included in the position information as the position where an abnormal interruption of communication has occurred. Further, the control unit 31 determines whether or not the occurrence position of the abnormal interruption of the communication is a position lower than the predetermined altitude. The predetermined altitude is, for example, a lower limit value of an altitude at which the vehicle 10 is not submerged in water even if a flood damage occurs.

Then, the control unit 31 detects that a flood damage has occurred in the same region in response to the number of times of occurrence of an abnormal interruption of communication at a position lower than a predetermined altitude in the same region being equal to or more than a predetermined number of times. The number of vehicles 10 in which an abnormal interruption of communication occurs at a position lower than a predetermined altitude may be a number within a predetermined time. The predetermined time is, for example, a time required for occurrence of abnormal interruption of a predetermined number of times or more in a case where flood damage occurs in the same area, that is, a time required for submergence of a predetermined number or more of vehicles 10. Here, the same region corresponds to, for example, the same municipality divided by the administrative division or the same region divided by the mesh. As another example, a region within a predetermined radius centered on one vehicle 10 in which an abnormal interruption of communication occurs at a position lower than a predetermined altitude may be set as the same region.

The control unit 31, for example, notifies the outside when detecting that a flood damage has occurred. For example, the control unit 31 may notify the vehicle 10 or the user's terminal existing in the area where it is detected that the flood damage has occurred that the flood damage has occurred. At this time, the control unit 31 may transmit the area in which it is detected that the flood damage has occurred in association with the map. For example, the control unit 31 may color on a map or surround a region in which flood damage has occurred with a line so as to be able to determine a region in which flood damage has occurred. Further, as another example, the control unit 31 may notify the name of the municipality of the area where the flood damage is occurring.

FIG. 3 is a flowchart of a process in which the server 30 according to the first embodiment detects occurrence of flood damage. The processing illustrated in FIG. 3 is executed in the server 30 at predetermined time intervals for each vehicle.

In S101, the control unit 31 acquires information related to the communication status. For example, the control unit 31 acquires a communication log stored in the storage unit 32. As another example, the control unit 31 may acquire the vehicle data 321. In S102, the control unit 31 determines whether or not an abnormal interruption has occurred. When the vehicle data is not transmitted from the vehicle 10 for a predetermined time, the control unit 31 determines that an abnormal interruption has occurred. The control unit 31 refers to the communication log or the vehicle data 321 and determines whether or not an abnormal interruption has occurred by determining whether or not a predetermined time has elapsed from the date and time when the last communication occurred. The predetermined time is a time longer than a time interval during which the vehicle 10 transmits the vehicle data 321. If the control unit 31 makes an affirmative determination in S102, the process proceeds to S103, and if the control unit 31 makes a negative determination, the routine ends.

In S103, the control unit 31 refers to the vehicle data 321 and acquires the last position information from the record corresponding to the vehicle 10. The position information includes information on latitude, longitude, and altitude. In S104, the control unit 31 identifies a region in which the vehicles 10 are located based on the position data acquired in S103. For example, the control unit 31 may identify the municipality in which the vehicle 10 is located based on the position information.

In S105, the control unit 31 determines whether or not the altitude acquired in S103 is less than a predetermined altitude. Therefore, in S105, the control unit 31 determines whether or not the vehicles 10 are located at an elevated location such that the vehicles are submerged when a flood damage occurs. When the altitude of the vehicle 10 is equal to or higher than the predetermined altitude, it can be determined that the vehicle 10 is not submerged in water. If the control unit 31 makes an affirmative determination in S105, the process proceeds to S106, and if the control unit 31 makes a negative determination, the routine ends.

In S106, the control unit 31 counts the number of occurrences of abnormal interruptions in the area specified in S105. For example, the control unit 31 counts the number of times that an abnormal interruption occurs and the altitude is equal to or lower than a predetermined altitude in the same area within a predetermined time.

In S107, the control unit 31 determines whether or not the number of times of abnormal interruption counted in S106 is equal to or greater than a predetermined number of times. The predetermined number of times is the number of times that a flood damage is considered to have occurred. If the control unit 31 makes an affirmative determination in S107, the process proceeds to S108, and if the control unit 31 makes a negative determination, the routine ends.

In S108, the control unit 31 detects occurrence of flood damage. In S109, the control unit 31 identifies the vehicles 10 located in the area identified in S104. The control unit 31 refers to the position information of the vehicle data 321 and identifies all the vehicles 10 located in the area identified in S104. Then, in S110, the control unit 31 notifies the vehicles 10 identified in S109 of the occurrence of the flood damage. The notification may include a command for displaying an image for notifying occurrence of flood damage on a display of the vehicle 10. The image may include a map indicating an area where flood damage has occurred. As another example, the control unit 31 may notify the user's terminal of the occurrence of flood damage. The terminal of the user may be registered in advance in association with the vehicle 10. Further, as another example, the control unit 31 may notify a terminal managed by a public institution that the occurrence of flood damage has been detected. As another example, the control unit 31 may notify the vehicle 10 located in an area adjacent to the area where the flood damage has occurred that the flood damage has occurred in the adjacent area. In addition, information about the area where the flood damage has occurred may be stored in the storage unit 32, and the information may be sold to a company or the like.

As described above, according to the present embodiment, it is possible to detect occurrence of flood damage based on a communication state with the vehicle 10.

Second Embodiment

In the second embodiment, communication is performed with the vehicle 10 located at a high place, and when a plurality of abnormal interruptions occur in communication with the vehicle 10 located at a low place, the control unit 31 detects that a flood damage has occurred. Note that a high place refers to a place at an altitude equal to or higher than the predetermined altitude described in S105, and a low place refers to a place below the predetermined altitude. Here, even when flood damage occurs, if the vehicle 10 is parked at a high place such as a multi-story parking lot, submergence is avoided. On the other hand, in a case where an abnormal interruption occurs in communication even though the vehicle 10 is located at a high place, it is considered that the vehicle 10 is not submerged in water but is caused by, for example, a communication failure. Therefore, the control unit 31 detects the occurrence of the flood damage when the number of occurrence of the abnormal interruption at the high place is small or 0 and the number of occurrence of the abnormal interruption at the low place is large.

Figure 4:
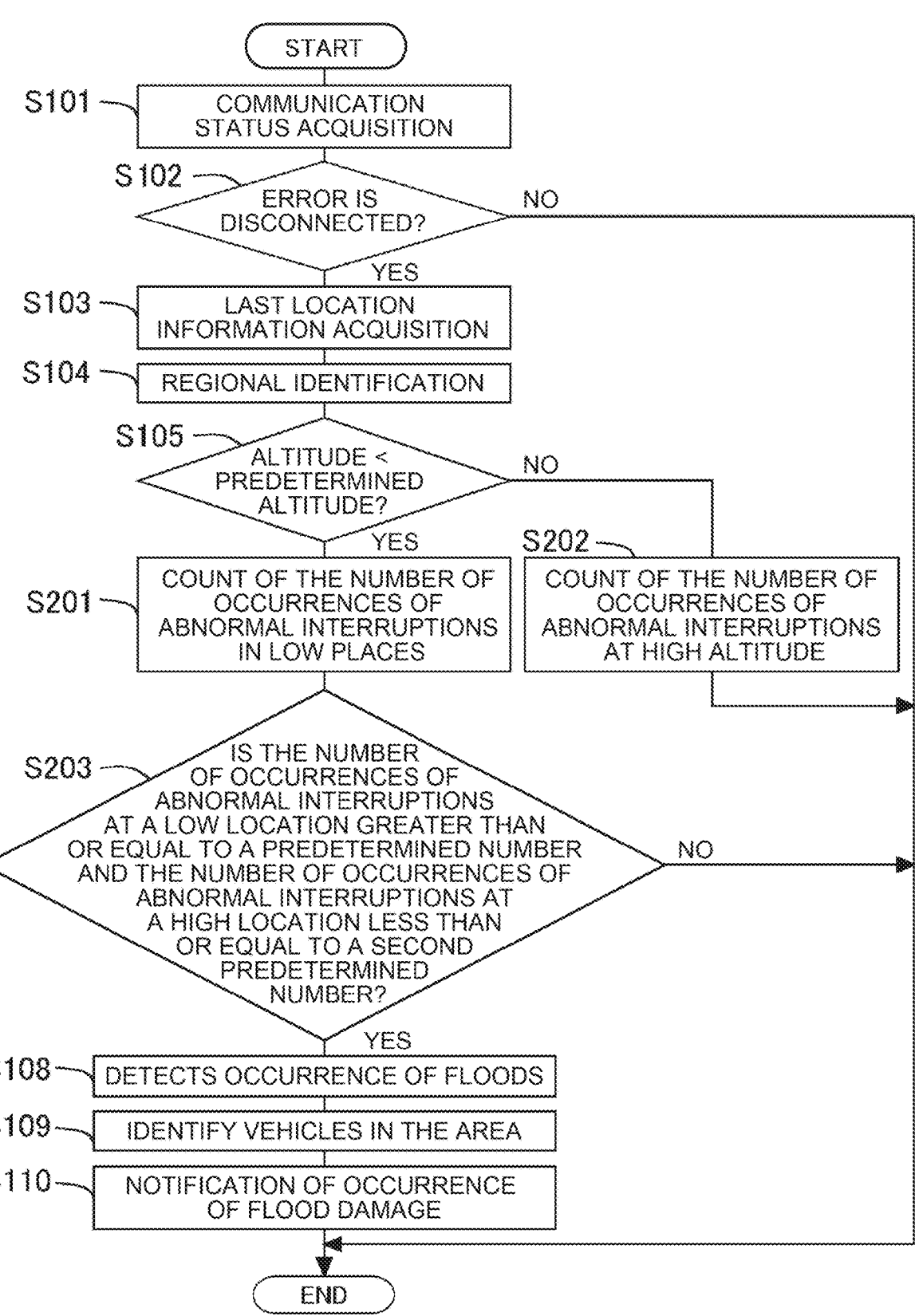
FIG. 4 is a flow chart of a process of detecting occurrence of flood damage by the servers according to the second embodiment.

FIG. 4 is a flowchart of a process in which the server 30 according to the second embodiment detects occurrence of flood damage. The processing illustrated in FIG. 4 is executed in the server 30 at predetermined time intervals for each vehicle. In FIG. 4, steps in which the same processing is performed on the routine shown in FIG. 3 are denoted by the same reference numerals, and description thereof will be omitted. In the routine shown in FIG. 4, if the control unit 31 makes an affirmative determination in S105, the process proceeds to S201, and if a negative determination is made, the process proceeds to S202.

In S201, the control unit 31 counts the number of occurrences of abnormal interruption of communication at a low place. When S201 process is completed, the process proceeds to S203. On the other hand, in S202, the control unit 31 counts the number of times of occurrence of abnormal interruption of communication at a high place. When S202 process is completed, the routine ends. In S203, the control unit 31 determines whether or not the number of occurrences of abnormal interruption at a low place counted in S201 is equal to or greater than a predetermined number of times and the number of occurrences of abnormal interruption at a high place counted in S202 is equal to or less than a second predetermined number of times within a predetermined period. Here, the predetermined number of times is the same as the predetermined number of times in S107. In addition, the second predetermined number of times is, for example, the number of abnormal interruptions that can occur even when no flood damage has occurred. The second predetermined number of times may be zero. As described above, in S203, the control unit 31 determines whether or not an abnormal interruption of communication occurs frequently at a low place and an abnormal interruption of communication does not occur frequently at a high place. If the control unit 31 makes an affirmative determination on S203, the process proceeds to S108, and if a negative determination is made, the routine ends.

As described above, according to the present embodiment, it is detected that a flood damage has occurred in a state in which an abnormal interruption of communication does not occur frequently at a high place and in a state in which an abnormal interruption of communication occurs frequently at a low place. Therefore, for example, it is possible to distinguish between a case where an abnormal interruption due to a communication failure occurs and a case where an abnormal interruption occurs due to a flood damage. Therefore, it is possible to improve the accuracy of detecting the occurrence of the flood damage.

Third Embodiment

In the third embodiment, a region in which flood damage is predicted to occur in the future is estimated in accordance with the occurrence state of flood damage. Here, when a region in which flood damage is occurring spreads, flood damage is detected in a plurality of regions. At this time, it is considered that flood damage spreads according to the order in which a plurality of areas are detected. Therefore, the control unit 31 estimates that the flood damage further spreads in the direction in which the flood damage spreads. For example, the control unit 31 may sequentially connect the center points (which may be centers) of the areas where floods have occurred, and predict that the areas on the extension lines are areas where floods have occurred in the future. As another example, the control unit 31 may use the hazard map to predict a region where flood damage occurs in the future. For example, the control unit 31 may predict that the flood damage occurs in an area within a predetermined distance from the area where the flood damage has occurred, and in an area where the hazard map indicates that the possibility of the flood damage occurring is high.

Figure 5:
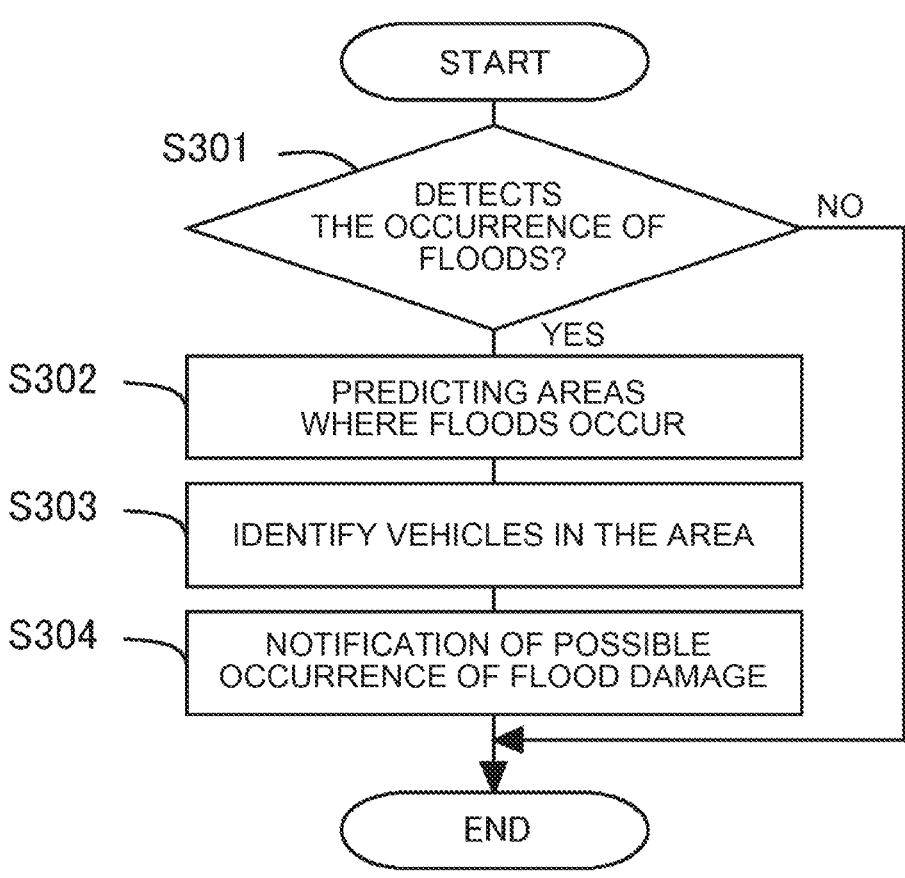
FIG. 5 is a flowchart of a process in which the server according to the third embodiment predicts occurrence of flood damage.

FIG. 5 is a flowchart of a process in which the server 30 according to the third embodiment predicts occurrence of flood damage. The processing illustrated in FIG. 5 is executed in the server 30 at predetermined time intervals.

In S301, the control unit 31 determines whether or not the occurrence of flood damage has been detected. The control unit 31 determines whether or not the occurrence of the flood damage is detected in the routine S108 illustrated in FIG. 3 within a predetermined period. Here, the predetermined time is set to a time required for the area where flood damage occurs to spread. For example, even if the area where flood damage occurred is detected a few days ago, it is not considered that flood damage will spread now. Such floods that are not related to the floods currently occurring are ignored. On the other hand, if it is determined that the detected flood damage continues at the present time, there is a possibility that the flood damage will spread to other areas. If the control unit 31 makes an affirmative determination in S301, the process proceeds to S302, and if the control unit 31 makes a negative determination, the routine ends.

In S302, the control unit 31 predicts a region where flood damage occurs. For example, in a case where flood damage occurs in a plurality of regions, it is considered that the time when the occurrence of flood damage is detected flows from the previous region toward the later region. Therefore, it is possible to predict that water will flow to an area on the extension line and flood damage will occur. That is, the area where the flood damage occurs may be predicted according to the time transition of the area where the occurrence of the flood damage is detected. In addition, it may be predicted that flood damage will occur in the area indicated in the hazard map in the vicinity of the area where flood damage has occurred.

In S303, the control unit 31 identifies the vehicles 10 located in the area where the flood damage is predicted to occur in S302. The control unit 31 refers to the position information of the vehicle data 321 and identifies all the vehicles 10 located in the area predicted in S302. Then, in S304, the control unit 31 notifies the vehicles 10 identified in S303 that there is a possibility of occurrence of flood damage. The notification may include a command for displaying an image indicating the possibility of occurrence of flood damage on a display of the vehicle 10. As another example, the control unit 31 may notify the terminal of the user of the vehicle 10 of the possibility of occurrence of flood damage. As another example, the control unit 31 may notify a terminal managed by a public institution of the possibility of occurrence of flood damage.

As described above, according to the present embodiment, it is possible to predict a region where flood damage occurs.

Other Embodiments

The above-described embodiment is merely an example, and the present disclosure may be appropriately modified and implemented without departing from the scope thereof. The processes and means described in the present disclosure can be freely combined and implemented as long as no technical contradiction occurs. Further, the processes described as being executed by one device may be shared and executed by a plurality of devices. Alternatively, the processes described as being executed by different devices may be executed by one device.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. Non-transitory computer-readable storage media include, for example, any type of disk, such as a magnetic disk (floppy (registered trademark) disk, hard disk drive (HDD), etc.), optical disk (CD-ROM, DVD disk, Blu-ray disk, etc.), read-only memory (ROM). Non-transitory computer-readable storage media include, for example, random access memory (RAM), EPROM, EEPROM, magnetic cards, flash memory, optical cards, any type of media suitable for storing electronic instructions.

What is claimed is:

1. An information processing device comprising one or more processors configured to:

communicate with first vehicles;

acquire communication status for each of the first vehicles;

acquire occurrences of abnormal interruptions in communications with abnormal interruption vehicles among the first vehicles;

acquire positions of each of the abnormal interruption vehicles;

determine whether each of the acquired positions is lower than a predetermined altitude;

count the number of second vehicles whose positions are determined to be lower than the predetermined altitude;

detect that a flood has occurred in a first region in response to the number of the second vehicles exceeding a first predetermined value in the first region; and output information on the flood in response to detection that the flood has occurred in the first region.

2. The information processing device according to claim 1, wherein the one or more processors are further configured to:

count the number of third vehicles whose positions are determined not to be lower than the predetermined altitude; and detect that the flood has occurred in the first region in response to the number of the third vehicles being equal to or less than a second predetermined value.

3. The information processing device according to claim 1, wherein the one or more processors are further configured to output the first region in which the flood has occurred, superimposed on a map.

4. The information processing device according to claim 1, wherein the one or more processors are further configured to predict a second region where the flood is expected to occur in a future based on time transition in a plurality of the first regions where occurrence of the flood has been detected.

5. The information processing device according to claim 1, wherein the one or more processors are further configured to send a notification about occurrence of the flood to a vehicle present in the first region or a terminal of an owner of the vehicle present in the first region.

* * * * *